(12) United States Patent
Burghardt et al.

(10) Patent No.: US 7,296,649 B2
(45) Date of Patent: Nov. 20, 2007

(54) DOOR-MOUNTED SEAT BELT RESTRAINT SYSTEM AND METHOD

(75) Inventors: Ross Burghardt, San Antonio, TX (US); Tu Pham, Fair Oaks Ranch, TX (US); Scott Caudill, Helotes, TX (US); Masahiro Tanabe, Shiga (JP)

(73) Assignee: Takata Seat Belts, Inc., Auburn Hills, MI (US)

( * ) Notice: Subject to any disclaimer, the term of this patent is extended or adjusted under 35 U.S.C. 154(b) by 152 days.

(21) Appl. No.: 11/104,279

(22) Filed: Apr. 12, 2005

(65) Prior Publication Data
US 2006/0225939 A1    Oct. 12, 2006

(51) Int. Cl.
B60R 21/00 (2006.01)
B60R 21/16 (2006.01)
(52) U.S. Cl. .................. 180/268; 280/735; 297/483
(58) Field of Classification Search ............. 180/268; 280/801.1, 803, 93.502; 297/473, 474, 475, 297/481, 483; 296/68.1
See application file for complete search history.

(56) References Cited

U.S. PATENT DOCUMENTS

| 3,672,699 A | 6/1972 | De Windt |
| 3,865,398 A | 2/1975 | Woll |
| 3,975,258 A | 8/1976 | Fox |
| 4,053,175 A | 10/1977 | Kato et al. |
| 4,315,639 A * | 2/1982 | Booth et al. ................ 280/803 |
| 4,344,502 A * | 8/1982 | Terabayashi ............... 180/268 |
| 4,708,366 A * | 11/1987 | Doty .......................... 280/803 |
| 4,747,616 A * | 5/1988 | Burris ........................ 280/807 |
| 5,062,662 A * | 11/1991 | Cameron .................... 280/733 |
| 5,161,821 A | 11/1992 | Curtis |
| 5,176,402 A * | 1/1993 | Coulon ....................... 280/807 |
| 5,226,672 A | 7/1993 | Husted |
| 5,340,052 A | 8/1994 | Ernst |
| 5,413,378 A | 5/1995 | Steffens, Jr. et al. |
| 5,831,342 A | 11/1998 | Vivacqua et al. |
| 6,069,325 A | 5/2000 | Aoki |
| 6,288,649 B1 | 9/2001 | Wolfe |
| 6,301,977 B1 * | 10/2001 | Stojanovski ........... 73/862.393 |
| 6,401,855 B1 | 6/2002 | Wolfe |
| 6,428,039 B1 * | 8/2002 | Pramler ...................... 280/735 |
| 6,448,512 B1 | 9/2002 | Cooper |
| 6,481,750 B1 * | 11/2002 | Kalina et al. ............ 280/801.1 |
| 6,508,514 B2 | 1/2003 | Wolfe |
| 6,550,810 B1 | 4/2003 | Bauer et al. |
| 6,581,960 B1 | 6/2003 | Schondorf et al. |
| 6,583,367 B2 | 6/2003 | Wolfe et al. |
| 6,612,614 B2 | 9/2003 | Wolfe |
| 6,616,186 B1 | 9/2003 | Midorikawa et al. |
| 6,662,670 B2 | 12/2003 | Clark |
| 6,679,524 B2 * | 1/2004 | Greib et al. ............. 280/801.1 |

(Continued)

Primary Examiner—Paul N. Dickson
Assistant Examiner—Joseph Rocca
(74) Attorney, Agent, or Firm—Fitch, Even, Tabin & Flannery (57) ABSTRACT

A system and method are provided for cancelling out downward directed tension forces generated on an object on a vehicle seat. In active, door-mounted seat belt systems, the belt tension force cancellation system includes a simulator that is operable to transfer upward forces on a door-mounted, lower anchor to the vehicle seat without requiring a permanent anchor point for the seat belt in the vehicle compartment. The simulator can either automatically transfer the forces upon securing the belt about the object, or be selectively operable.

18 Claims, 5 Drawing Sheets

U.S. PATENT DOCUMENTS

| | | |
|---|---|---|
| 6,715,792 B2 * | 4/2004 | Yamachi et al. ......... 280/801.2 |
| 6,725,727 B2 * | 4/2004 | Rogers et al. ................. 73/779 |
| 6,808,201 B2 | 10/2004 | Aoki |
| 6,840,119 B2 | 1/2005 | Aoki |
| 6,843,143 B2 | 1/2005 | Steele et al. |
| 6,849,807 B2 | 2/2005 | Casey et al. |
| 6,851,655 B2 | 2/2005 | Kume et al. |
| 6,974,192 B2 * | 12/2005 | Miwa et al. ................ 297/473 |
| 2002/0139196 A1 * | 10/2002 | Resh et al. .................... 73/827 |
| 2003/0066362 A1 | 4/2003 | Lee et al. |
| 2003/0070846 A1 | 4/2003 | Wolfe et al. |
| 2003/0160143 A1 * | 8/2003 | Miwa et al. ................. 248/430 |
| 2003/0184076 A1 * | 10/2003 | Devereaux et al. ......... 280/806 |
| 2004/0049461 A1 * | 3/2004 | Curtis et al. ................... 705/45 |
| 2004/0159485 A1 * | 8/2004 | Sakai et al. ................. 180/268 |

\* cited by examiner

DOOR-MOUNTED SEAT BELT RESTRAINT SYSTEM AND METHOD

FIELD OF THE INVENTION

The invention relates to door-mounted seat belt systems and, more particularly, to a seat belt system and method that allows for more accurate determinations of weight of an object on a seat.

BACKGROUND OF THE INVENTION

Many vehicles have several different passenger restraint mechanisms that are operable in the event of emergency conditions. When an emergency condition is detected, retractor locks are operable to block further payout of belt webbing from the retractor spool. Pretensionsers may be operable to eliminate slack in the seat belt webbing. Airbags may be deployed both inside and outside of the vehicle to protect both passengers and pedestrians. It is important that these various restraint systems have their operation properly synchronized to provide the most effective restraint to passengers in the vehicle compartment. In some instances, it is also desirable to have the systems disabled. In particular, due to the force with which an airbag may deploy, it is usually not desirable for the airbag to be operable if a very small adult or child is in the vehicle seat associated with the airbag.

In this regard, various sensor systems have been proposed to attempt to accurately weigh the seat occupant to discern whether the occupant is in the lower 5 percentile range of weights for females such as a small child so that operation of the airbag can be disabled. One significant difficulty arises due to the downward tension forces generated by the secured seat belt about the occupant. The seat belts in active systems are usually automatically retracted on the spool of retractors with a rewind spring mechanism so that cinching of the belt about the occupant generates tension forces, particularly in the lap belt portion that tend to push the occupant downwardly into the vehicle seat. It will be appreciated that this problem is exacerbated when an auxiliary child or booster seat is placed on the vehicle seat. In this instance, the increased height of the auxiliary seat is such that cinching of the seat belt over the child and auxiliary seat adds even more downwardly directed tension force than would be present if the child were seated directly on the vehicle seat without the auxiliary seat thereon.

Several solutions have been proposed to address the tension forces generated by the secured seat belt. In some instances, these solutions provide for specific locations for the seat weight sensors (SWS) and/or utilize belt tension sensors (BTS) in the seat belt in an attempt to compensate for the seat belt tension. Other solutions also employ vision-type detector systems that attempt to determine whether a child seat is present by the detected size and distance from the sensor object is on the seat. Several propose relatively complex algorithms for interpreting the data received from the sensors. Perhaps the simplest solution has been to place both of the lower anchors in a three-point active, seat belt system, for instance, on the seat frame just above the seat weight sensors so that the downward forces generated by the secured seat belt on the seat occupant are offset by the upward forces generated at either side of the seat on the anchors.

Active, door-mounted seat belt systems provide the advantage of keeping all the seat belt systems components but the buckle and its anchor out of the passenger compartment when the seat belt is not in use. In these systems, the retractor and the shoulder anchor are both mounted to the door. The lower, outboard anchor for the three-point door-mounted belt system is also mounted to the door. In many newer model vehicles, these active, door-mounted seat belt systems are highly desirable to provide more of an open cabin feel in the vehicle passenger compartment. Putting the lower, outboard anchor on the seat frame to compensate for belt tension forces on the seat occupant is not a good option as it can detract from the desired open cabin feel. More importantly, such a placement of a permanent anchor point for the belt in the passenger compartment such as on the vehicle seat frame creates a length of webbing that extends from the vehicle interior to the door even when the door is open making passenger ingress and egress from the vehicle more difficult and providing the vehicle with undesirable aesthetics. Thus, for these active, door-mounted seat belt systems, the prior art solutions focus on the use of weight and tension sensors, vision detection systems and/or complicated algorithms to determine the presence of a very small adult or child on a vehicle seat rather than creating the problems discussed above with moving the lower, door anchor to the vehicle seat frame.

Accordingly, there is a need for a door-mounted seat belt system that has a simple mechanism for compensating for seat belt tension. Further, the door-mounted system should not present an obstacle to passenger ingress and egress from the vehicle when the door is open.

SUMMARY OF THE INVENTION

In accordance with the present invention, a system and method of compensating for seat belt tension forces are provided for a door-mounted seat belt system. In particular, the door-mounted seat belt system includes a retractor, and upper shoulder anchor, and a lower, outboard anchor that are all mounted to the vehicle door, while the buckle anchor is mounted on the inboard side of the vehicle seat frame. In one form of the present system, there is means for simulating the mounting of the door-mounted anchor to the vehicle seat. The simulating means is operable to substantially cancel out the downward directed forces generated on the vehicle seat by the seat belt secured about an object. In this manner, seat weight sensors on the vehicle seat frame are able to accurately measure the weight of an object on the seat, which weight can then be used by an electronic control system of the vehicle to enable or disable operation of an airbag associated with the seat. Herein, the term object has its normal meaning so that it can include an adult passenger or the combination of an auxiliary seat and a child that are on the vehicle seat.

In a preferred form, the simulating means is a force transfer means for transferring generally upward directed forces applied to the door-mounted anchor by the secured seat belt to the vehicle seat to substantially cancel out generally downward directed forces applied to an object on the vehicle seat by the secured seat belt. The force transfer means may be a mechanical force transfer means, and can include powered or motorized force transfer means as well.

In one form, the simulating means includes cooperating arms of the vehicle seat and the lower door anchor that engage with the seat belt secured about an object on the seat.

In another form, the simulating means can be a user-operated means for allowing a user to selectively cancel out the downward directed forces applied to an object on the vehicle seat by the secured seat belt. With a primary tongue plate and buckle connected at an inboard site of the seat, the user operated means can be a secondary tongue plate and buckle for being selectively connected at an outboard side of the seat, such as would be desirable when a very small adult or child or booster seat in which a child is seated are on the seat.

In another form of the invention, a passenger restraint system is provided including a retractor mounted to the vehicle door, and a lower anchor to which seat belt webbing is secured also mounted to the vehicle door adjacent an outboard side of the seat. The seat includes at least one seat weight sensor arranged for measuring weight of an object thereon. A buckle having an anchor is mounted to an inboard side of the seat. A tongue plate is carried on the belt webbing for being latched in the buckle. A lower anchor simulator for the seat is provided that allows a connection between the seat belt webbing or the lower anchor for the webbing and the seat to be established that is operable with the seat belt webbing secured about the object on the seat with the simulator connection being separate from the latched tongue plate and buckle.

The simulator connection is preferably at the outboard side of the seat.

Preferably, the lower anchor simulator includes cooperating portions of the lower anchor and the seat which are operably engaged with the seat belt secured about an object on the seat to form the simulator connection. The cooperating portions can include respective arms of a seat frame rail to which the seat weight sensor is mounted, and the lower anchor.

In one form, the lower anchor simulator can be a second buckle having an anchor mounted to the outboard side of the seat and a second tongue plate on the seat belt webbing with the simulator connection being the second tongue plate latched in the second buckle.

The passenger restraint system is particularly useful in conjunction with an airbag that is provided for being inflated adjacent the vehicle seat in emergency conditions. The lower anchor simulator is operable to substantially cancel out downward forces of the secured seat belt about the object to allow the seat weight sensor to substantially, accurately measure weight of the object on the seat. A controller for the airbag receives the substantially accurately measured weight of the object by the seat weight sensor and based on the object weight disables or enables operation of the airbag.

In another aspect, a method of cancelling seat belt tension forces is provided including securing a door-mounted seat belt about an object on a vehicle seat, transferring upward directed forces on a door-mounted lower anchor for the seat belt to the vehicle seat, and cancelling downward directed forces generated by the secured seat belt on the object by the transferred upward directed forces.

In one form, the transfer of the upward directed forces occurs automatically as an incident of securing the seat belt about the object on a seat. In another form, the upward directed forces are transferred selectively.

DETAILED DESCRIPTION OF THE PREFERRED EMBODIMENTS

Figure 1:
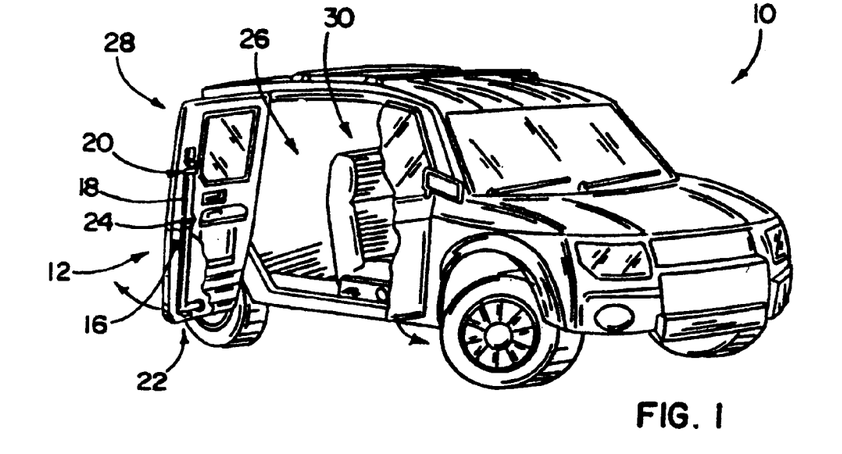
FIG. 1 is a perspective view of a vehicle equipped with a door-mounted seat belt system in accordance with the present invention showing a lower, anchor simulator.
Figure 2:
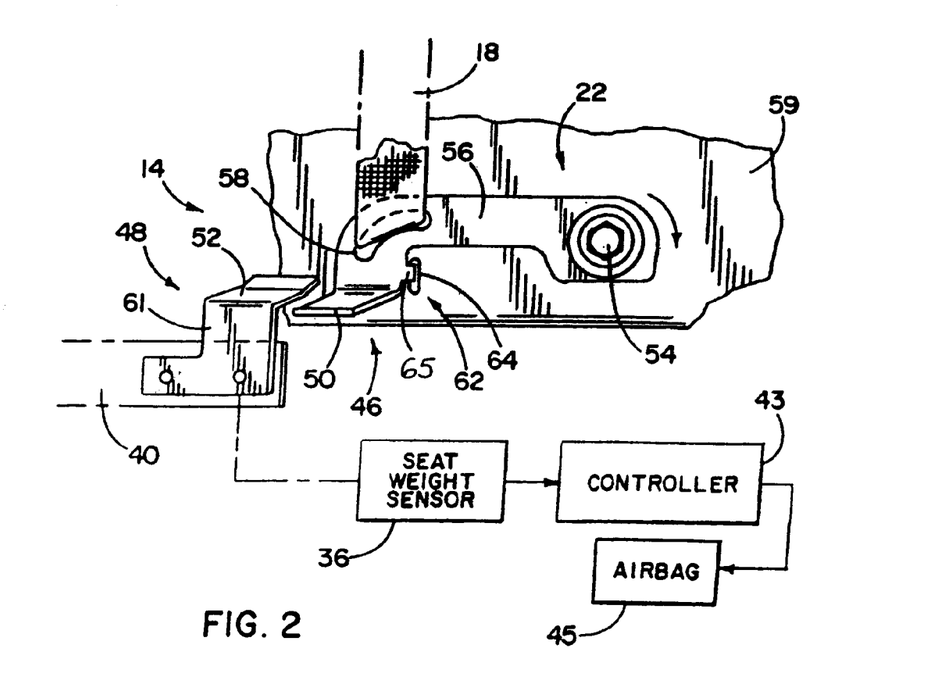
FIG. 2 is an enlarged perspective view of the lower anchor simulator showing a lower, door-mounted anchor and an adjacent, vehicle seat frame member and the corresponding simulator arm of each.

In FIGS. 1 and 2, a vehicle 10 having a door-mounted seat belt restraint system 12 that includes one form of a lower anchor simulator 14 is depicted. The seat belt system 12 preferably has a common three-point configuration so that it includes a retractor 16 for seat belt webbing 18, an upper shoulder anchor 20, and a lower anchor 22. The webbing 18 carries a sliding latch or tongue plate 24. Other seat belt system configurations could also be employed.

To provide the passenger compartment 26 of the vehicle 10 with more of an open feel, it is desirable to minimize the number of components of the seat belt system 12 that are located in the passenger compartment 26, such as mounted to the vehicle seats, floor or up along the pillars upstanding therefrom. To this end, the retractor 16, shoulder anchor 20, and lower anchor 22 are all preferably mounted to the vehicle door 28. The illustrated vehicle 10 is similar to an SUV except that it has more of a box shape passenger compartment 26 such as in Honda Element vehicles. In this configuration, the seat belt system 12 for the front passenger seat 30 is mounted along the forward, vertical edge of the rear door 28 on the interior side thereof so that the tongue plate 24 is readily accessible to the passenger occupants seated on the passenger seat 30.

Figure 3:
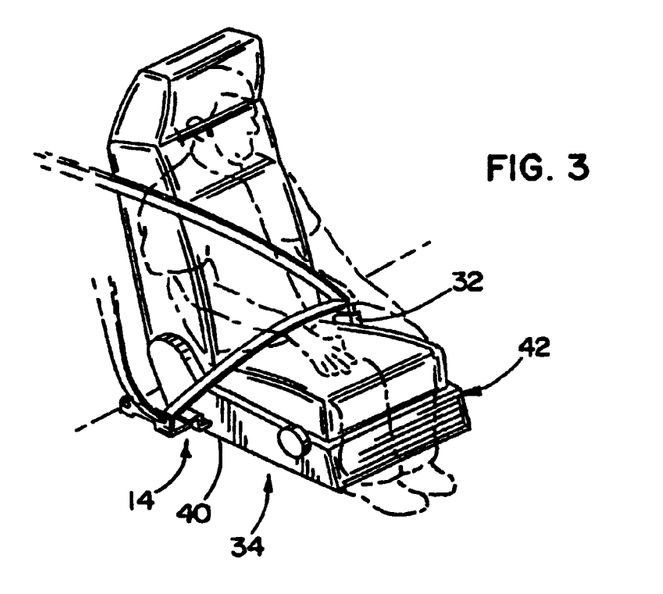
FIG. 3 is a perspective view of the door-mounted seat belt system in a three-point anchor system configuration showing the seat belt secured about a full-size occupant.
Figure 4:
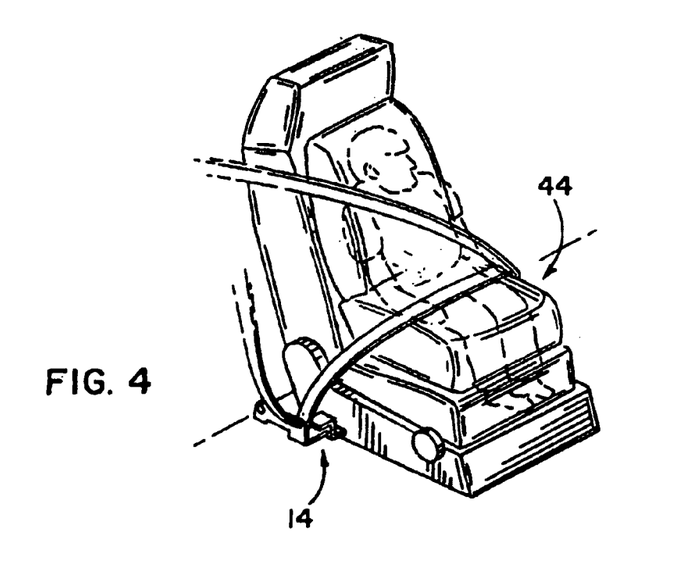
FIG. 4 is similar to FIG. 3 and shows the seat belt system secured about an auxiliary child seat.

In addition, it is desirable to avoid having the webbing 18 from the door-mounted seat belt system 12 extending between the open door 28 and the passenger compartment 26 when the seat belt webbing 18 is not secured about a seat occupant. This is particularly true when the occupant is other than a small child in an auxiliary seat as otherwise such a span of webbing between the door 28 and the passenger compartment 26 can present an obstacle for ingress and egress into and out from passenger compartment 26. The present lower anchor simulator 14 avoids a permanently fixed anchor point for the seat belt webbing 18 in the passenger compartment 26. Instead, only anchor 31 provided for the buckle 32 (FIGS. 3 and 7) is in the vehicle compartment 26 on vehicle seat 30 and forms a releasable anchor point for the webbing 18. At the same time, the simulator 14 is able to transfer the upwardly directed forces thereon to the seat frame 34 with the tongue plate 24 latched in the buckle 32 about an occupant on the seat 30, as shown in FIG. 3. In this manner, the simulator 14 allows for accurate weight measurement of an object on the seat 30, as will be described further herein.

The present passenger restraint system 12 employs at least one seat weight sensor, and preferably multiple sensors 36 at various locations about the frame 34 of the seat 30. Usually, there will be seat weight sensors 36 on either side rail 40 and 42 of the seat frame 34. The seat weight sensors 36 can be strain gauges, although any known weight sensor can be employed. Generally, four strain gauges 36 will be utilized such as one at each end of the seat frame rails 40 and 42 will their readings summed to provide the weight of the object on the seat.

As has previously been discussed, when there is an occupant on the seat and the seat belt 18 is secured about the occupant (FIG. 3), the tension forces of the secured seat belt 18 can cause erroneous weight readings to be generated by the sensors 36, which are then transmitted to the airbag controller 43. Where the occupant is an adult, this is not a serious problem as typically this added weight will not affect the determination by controller 43 of whether an airbag 45 is to be deployed. However, in the situation where there is an auxiliary seat such as a child or booster seat 44 supported on the seat 30 for use with a infant or a small child, this extra force generated by the tension in the secured seat belt 18 needs to be accounted to ensure that the controller 43 properly disables the airbag 45. This is also true where the adult is unusually small, such as a lower 5 percentile weight female. Rather than mounting both the lower anchor 22 and the buckle anchor 31 to the respective outboard and inboard seat frame rails 40 and 42 to achieve force cancellation as previously discussed, the outboard anchor 22 is mounted to the door 28 and the lower anchor simulator 14 is employed.

Figure 5:
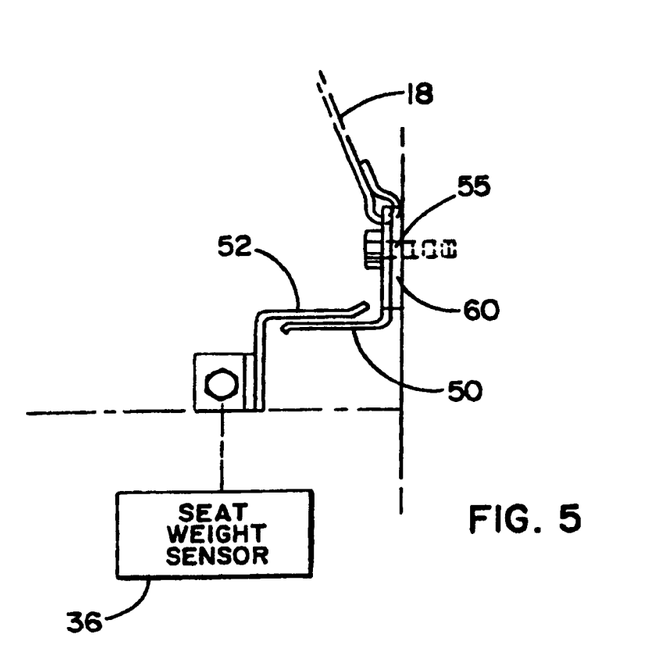
FIG. 5 is an elevational view of the arms of FIG. 2 prior to having the seat belt secured about the seat occupant.
Figure 6:
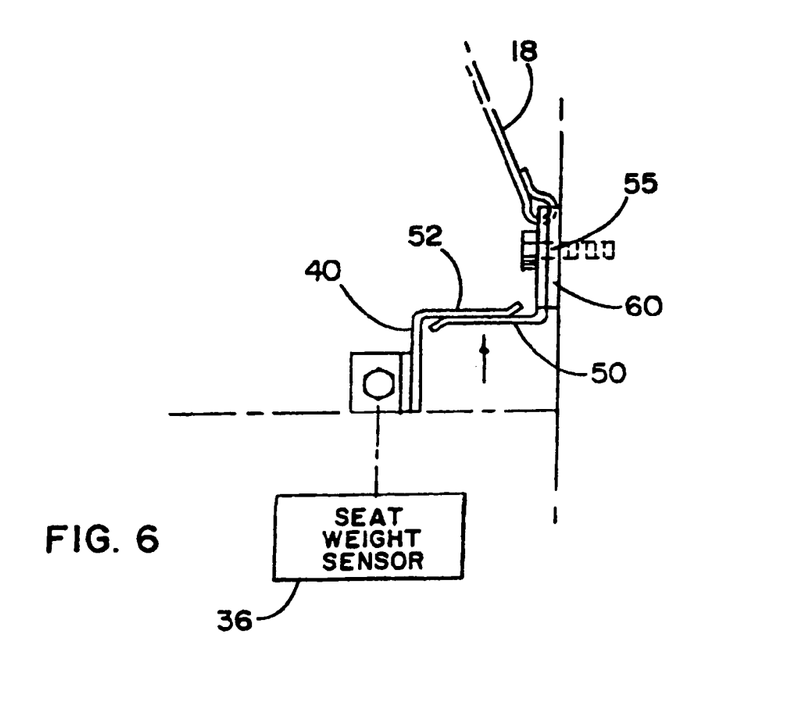
FIG. 6 is an elevational view similar to FIG. 5 with the seat belt secured about the occupant as in FIGS. 3 and 4 showing the arms engaged to transfer the upward forces on the anchor generated by the secured seat belt to the seat frame.

Referring to FIGS. 2, 5 and 6, the simulator 14 includes portions 46 and 48 of the lower anchor 22 for the seat belt 18 and the seat 30, and more specifically the outboard rail 40 thereof As shown, these portions 46 and 48 can take the form of arms 50 and 52, respectively, that extend toward each other and overlap so that they can engage one another when the seat belt webbing 18 is secured about an object on the seat 30. In this regard, the arms 50 and 52 form a mechanical linkage between the anchor 22 and the seat 30 with the seat belt 18 secured about an object on the seat 30. For this purpose, the lower anchor 22 preferably includes a pivot mount 54 for pivotably mounting anchor member 56 to the door 28, and specifically to a rigid body member 59 thereof, while the arm 52 is rigidly fixed to the rail 40. The pivot mount 54 can include a pivot shaft 55 about which the anchor member 56 can pivot. Further, to allow for slight inboard and outboard shifting of the anchor member 56, resilient member 60 can be mounted between the anchor member 56 and door member 59. The resilient member can be in the form of a spring or thrust washer 60 that is mounted about the pivot shaft 55 which allows for inboard and outboard flexing of the anchor member 56 as the belt 18 is secured about an object on the seat 30 and the secured belt 18 is loaded.

The anchor member 56 has a belt webbing slot 58. As can be seen in FIG. 2, the slot 58 is formed toward the forward end of the anchor member 56 adjacent the transversely extending arm 50 opposite the pivot mount 54 at the rear end of the anchor member 56. The webbing 18 extends through the slot 58 and is folded back on itself and sewn thereto so that the webbing 18 is substantially permanently fixed to the anchor member 56.

Prior to latching of the tongue plate 24 in the buckle 32, the anchor arm 50 is in clearance below the seat arm 52 with the vehicle door 28 closed as shown in FIGS. 2 and 5, so that the arms 50 and 52 do not interfere with closing of the vehicle door 28 via engagement with one another. However, closing of the door 28 brings the arm 50 into alignment with the arm 52 therebelow, as best seen in FIG. 5. When the tongue plate 24 is latched into the buckle 32 to secure the webbing 18 about the occupant or auxiliary seat 44, the upwardly directed forces on the lower anchor 22 will cause the anchor member 56 to shift upwardly as by pivoting about the mount 54. This brings the anchor arm 50 into engagement with the rigid anchor arm 52 extending transversely from the outboard seat rail 40, as shown in FIG. 6. In this manner, the upwardly directed forces applied to the lower anchor 22 by the secured seat belt 18 are mechanically transferred to the seat frame 34, and particularly the outboard rail 40 thereof.

The rail arm 52 is shown as being formed integrally with a mounting bracket 61 that is fixed to the outboard rail 40. The bracket 61 is attached to the rail 40 at a location above the seat weight sensor 36. Likewise, the buckle anchor 31 is disposed above the corresponding seat weight sensor 36 associated with the inboard seat frame rail 42. In this manner, the downwardly directed forces applied by the tensioned seat belt webbing 18 on the occupant or child seat 44 are substantially cancelled out by the upwardly directed forces on the buckle anchor 31 and the lower anchor 22 at the seat weight sensors 36 associated with each of the seat frame rails 40 and 42. As is apparent, operation of the simulator 14 requires no intervention by the user or vehicle occupant beyond the latching of the tongue plate 24 in the buckle 32 as with normal use of the door-mounted seat belt system 12.

Turning to more of the details, a guide device 62 can be provided so that lower anchor 22 is guided in its shifting up and down as the seat belt 18 is buckled and unbuckled with an occupant in the seat. Referring to FIG. 2, the guide device 62 can include a vertically-extending slot 64 in the door member 59. The device 62 further includes a bent tab 65 that extends at right angles from the anchor member 56 toward the door member 59 and into the slot 64 thereof. As illustrated, the tab 65 is formed adjacent the forward end of the anchor member 56 just above the anchor arm 50.

Figure 7:
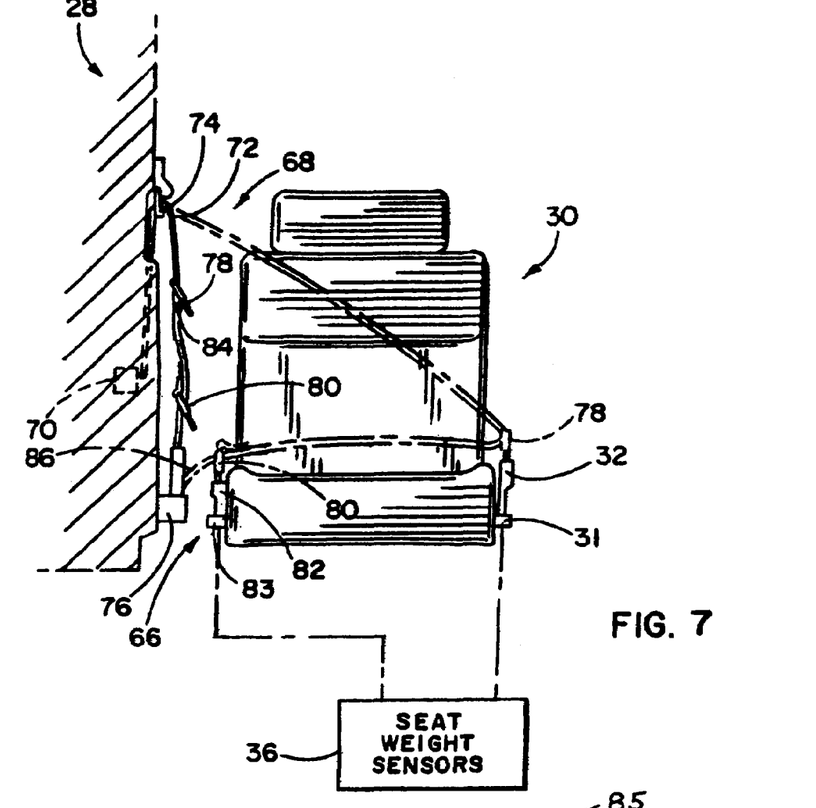
FIG. 7 is an elevational view of an alternative lower anchor simulator including a seat belt system having primary and secondary tongue plates and corresponding buckles therefor.

Referring next to FIG. 7, an alternate form of an anchor simulator 66 is illustrated. In the belt tension force compensating system of FIG. 7, there is a door-mounted seat belt system 68 similar to the system 12 but for the differences in the respective simulators 14 and 66. In this regard, the seat belt system 68 includes a retractor 70 in which a spool of seat belt webbing 72 is wound. The webbing 72 extends up from the retractor 70 through a shoulder anchor 74 in the form of a guide loop. The webbing 72 is redirected by the guide loop and extends down to a fixed, lower anchor 76. As shown, each of the retractor 70, shoulder anchor 74 and lower anchor 76 are rigidly mounted to the vehicle door 28 similar to corresponding components of the seat belt system 12. In addition, the buckle anchor 31 and upwardly projecting buckle 32 are mounted to the inboard side of the vehicle seat 30 at the inboard rail 42 as in seat belt system 12.

Figure 7A:
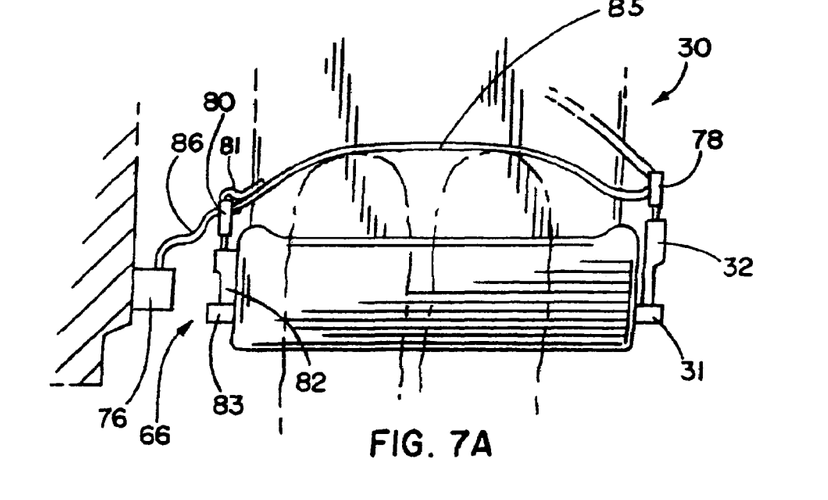
FIG. 7A is an enlarged elevational view of the lap belt portion of the seat belt system of FIG. 7 showing the tongue plates secured in the corresponding buckles with the lap belt portion extending over the lap of the occupant.

In the system 68, in addition to a primary tongue plate 78 that is slidably carried on the belt webbing 72 between the shoulder anchor 74 and lower anchor 76 for being releasably latched into the buckle 32, there is a secondary tongue plate 80 of the simulator 66. The simulator tongue plate 80 can be attached to the belt webbing 72 by a separate belt member 81 sewn to lap belt portion 85. A buckle 82 is anchored to the outboard seat frame rail 40 at 83 and is adapted to releasably receive the secondary tongue plate 80 latched therein. The spacing between the tongue plate 78 as provided by a stop 84 on the belt webbing 72 and the tongue plate 80 along the lap belt portion 85 and including the belt member 81 is such that when both are latched in their respective buckles 32 and 82, there will be slack generated in the belt webbing portion 86 extending between the lower anchors 76 and 83 with the lap belt portion 85 otherwise tautly extending about the occupant's lap, as shown in FIG. 7A. In this manner, the upwardly directed loading 76 normally applied to the door-mounted, lower anchor 76 is instead transferred and applied to the lower buckle anchor 83. Thus, the lower anchor simulator 66 includes cooperating portions of the belt webbing 72 and seat 30, and specifically seat frame rail 40 thereof, in the form of the secondary tongue plate 80 attached to the webbing 72 and the buckle 82 anchored to the rail 40, which form a mechanical linkage therebetween.

The operation of the lower anchor simulator 66 necessitates additional user intervention beyond that of buckling the tongue plate 78 in the inboard buckle 32 as it also requires the secondary tongue plate 80 to be latched into the outboard buckle 82. Thus, in contrast to the lower anchor simulator 14 that operates to cancel out seat belt tension forces automatically upon securing the seat belt 18 about an object on the seat 30, the lower-anchor simulator 66 requires that a user also latch the tongue plate 80 into the buckle 82 so that cancellation of tension forces can occur for accurate weight readings of the object by the seat weight sensors 36. In this regard, it should be noted that for typical vehicle occupants that do not need to employ a child or booster seat 44 based on their size, it will be desirable for operation of the airbag associated with the seat 30 to be enabled. For example, an adult occupant can use the seat belt system 68 in its typical configuration by only latching the tongue plate 78 in the buckle 32. Any extra downward force generated by the tension in the seat belt webbing 72 secured about the occupant will have no consequence with respect to airbag operation, as the airbag will be enabled even with the appropriate reading of the adult occupants weight such as could occur if they were to latch the secondary tongue plate 80 in the buckle 82. Accordingly, latching the tongue plate 80 in the buckle 82 is optional for adult seat occupants.

On the other hand, when a child or booster seat 44 is placed on the seat 30, it will be necessary for the user or occupant to latch both the tongue plate 78 and the tongue plate 80 in their respective buckles 32 and 82 so that a proper weight reading can be obtained via the sensors 36. To this end, the simulator tongue plate 80 and buckle 82 can be identified for use with such an auxiliary seat 44 as by indicia thereon to alert the user, who typically will be an adult buckling in children in the auxiliary seat 44 on the seat 30, that the tongue plate 80 should be latched into the buckle 82. Very small adults, e.g. in the lower 5 percentile range of adult female weights, can also be advised to buckle the tongue plate 80 in the buckle 82. However, because of this extra intervention, it will be appreciated that the lower anchor simulator 14 is more preferred than the lower anchor simulator 66. Nevertheless, it can be seen that both simulators 14 and 66 avoid the need to have a permanent connection between their corresponding vehicle seat simulator portions 48 and 82 and the seat belt webbing 18 and 72, respectively, as would be present if the lower, outboard seat belt anchor were moved off the vehicle door to the adjacent, outboard seat frame rail 40 for seat belt tension cancellation purposes. Accordingly, the simulator 14 only requires that the occupant unlatch the tongue plate 24 from the buckle 32 to avoid having a length of webbing 18 extending between the door 28 and passenger compartment 26, and particularly the seat 30 therein. Similarly, the simulator 66 only requires that in addition to unlatching the tongue plate 78 from the buckle 32, that the tongue plate 80 be unlatched from the buckle 82 as well so as to avoid having a length of belt webbing 72 extending between the vehicle door 28 and vehicle seat 30. This is of particular value when the door 28 is open so that the passengers have substantially unobstructed ingress and egress from the vehicle passenger compartment 26.

Figure 8:
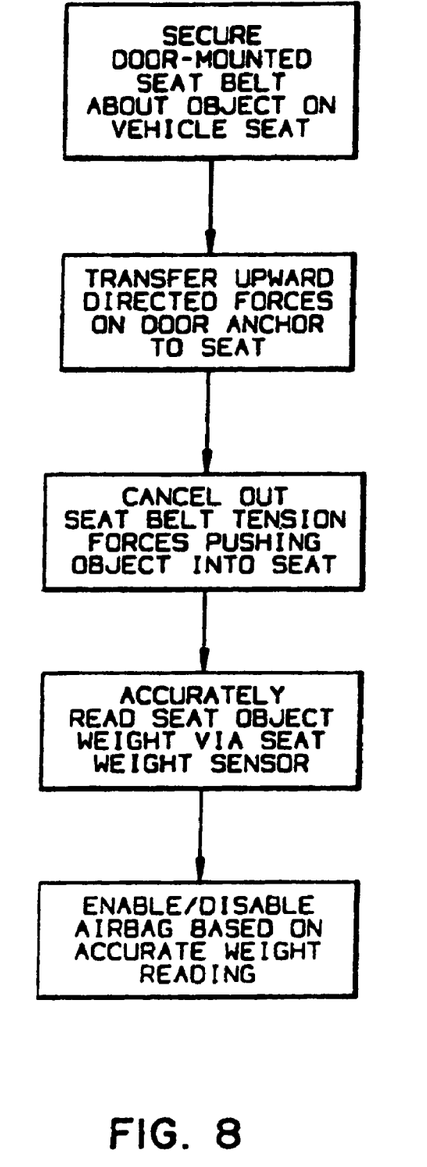
FIG. 8 is a flow chart of the method of operation of the door-mounted seat belt systems of FIGS. 1-7 for cancelling out seat belt tension forces for accurately measuring the weight of an object on the vehicle seat.

To summarize the method of operation of the tension compensating systems described herein including the respective lower anchor simulators 14 and 66 thereof and referring to FIG. 8, the door-mounted seat belts are first secured about an object on the vehicle seat. Next, the upward directed forces on the lower, outboard anchor of the seat belt system are transferred to the seat frame, and specifically the adjacent outboard rail thereof, either automatically as an incident of latching the inboard tongue plate and buckle as with lower anchor simulator 14, or selectively as with the simulator 66 by the required latching of the outboard tongue plate and buckle. This force transfer is operable to cancel the seat belt tension forces pushing the object downward into the seat at the outboard side thereof. Thereafter, with the downward seat belt forces cancelled, the seat weight sensors are operable to accurately read the weight of the object on the seat with the airbag either enabled or disabled based on this accurate weight reading. While the means for simulating the mounting of the door mounted, lower anchor to the vehicle seat take advantage of exclusively mechanical force transfer means via the lower anchor simulators 14 and 66 described herein, it is also anticipated that powered or motorized mechanisms could also be employed to transfer the upwardly directed forces on the door-mounted lower anchor to the vehicle seat 30, and particularly the outboard, seat frame rail 40 thereof adjacent the vehicle door 28.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A system for compensating for tension in a secured seat belt to accurately measure weight on a vehicle seat, the system being in combination with a vehicle and comprising:
   a door-mounted retractor for the seat belt;
   a door-mounted lower anchor for the seat belt;
   a vehicle seat having a seat weight sensor operatively mounted thereto;
   means for simulating the mounting of the door-mounted anchor to the vehicle seat to substantially cancel out generally downward directed forces applied to an object on the vehicle seat by the secured seat belt and allow for the seat weight sensor to accurately measure weight of the object on the seat; and
   a passenger compartment of the vehicle in which the vehicle seat is disposed, and the simulation means includes cooperating portions of the door-mounted lower anchor or seat belt and the vehicle seat with the vehicle seat portion lacking a permanent connection to the seat belt.

2. The system of claim 1 wherein the simulating means comprises force transfer means for transferring generally upward directed forces applied to the door-mounted lower anchor by the secured seat belt to the vehicle seat to substantially cancel out generally downward directed forces applied to an object on the vehicle seat by the secured seat belt.

3. The system of claim 2 wherein the force transfer means comprises a mechanical force transfer means.

4. A system for compensating for tension in a secured seat belt to accurately measure weight on a vehicle seat, the system comprising:
   a door-mounted retractor for the seat belt;
   a door-mounted lower anchor for the seat belt; and
   a vehicle seat having a seat weight sensor operatively mounted thereto;
   means for simulating the mounting of the door-mounted anchor to the vehicle seat to substantially cancel out generally downward directed forces applied to an object on the vehicle seat by the secured seat belt and allow for the seat weight sensor to accurately measure weight of the object on the seat,
   wherein the simulating means includes cooperating arms of the vehicle seat and the lower anchor that engage with the seat belt secured about an object on the seat.

5. The system of claim 4 wherein the lower anchor includes a mount that allows the anchor arm thereof to shift a sufficient amount as the seat belt is being secured about the object on the seat so that the cooperating arms engage with the seat belt secured.

6. The system of claim 5 wherein the mount is a pivot mount so that the anchor arm pivots into engagement with the vehicle seat arm.

7. A system for compensating for tension in a secured seat belt to accurately measure weight on a vehicle seat, the system comprising:
   a door-mounted retractor for the seat belt;
   a door-mounted lower anchor for the seat belt; and
   a vehicle seat having a seat weight sensor operatively mounted thereto;
   means for simulating the mounting of the door-mounted anchor to the vehicle seat to substantially cancel out generally downward directed forces applied to an object on the vehicle seat by the secured seat belt and allow for the seat weight sensor to accurately measure weight of the object on the seat,
   wherein the vehicle seat includes a frame rail to which the seat weight sensor is mounted, and the simulating means includes a mechanical linkage between the door-mounted lower anchor and the seat frame rail that is operable with the seat belt secured about the object on the seat.

8. The system of claim 7 including a first buckle anchored at one side of the seat and a first tongue plate on the belt that latches into the first buckle for securing the seat belt about the object on the seat, and the mechanical linkage comprises a second buckle anchored at an opposite side of the seat and a second tongue plate on the belt that latches into the second buckle to transfer the upwardly directed forces on the lower anchor to the latched second tongue plate and second buckle.

9. A system for compensating for tension in a secured seat belt to accurately measure weight on a vehicle seat, the system comprising:
   a door-mounted retractor for the seat belt;
   a door-mounted lower anchor for the seat belt;
   a vehicle seat having a seat weight sensor operatively mounted thereto; and
   means for simulating the mounting of the door-mounted anchor to the vehicle seat to substantially cancel out generally downward directed forces applied to an object on the vehicle seat by the secured seat belt and allow for the seat weight sensor to accurately measure weight of the object on the seat,
   wherein the simulating means comprises user-operated means for allowing a user to selectively cancel out the downward directed forces applied to an object on the vehicle seat by the secured seat belt.

10. The system of claim 9 including a primary tongue plate and buckle for being connected at an inboard side of the seat, and the user-operated means comprises a secondary tongue plate and buckle for being selectively connected at an outboard side of the seat.

11. A passenger restraint system for a vehicle having a door providing access to a seat in a passenger compartment, the passenger restraint system comprising:
   a retractor for seat belt webbing with the retractor being mounted to the vehicle door;
   a lower anchor to which the seat belt webbing is secured with the lower anchor being mounted to the vehicle door adjacent an outboard side of the seat;
   at least one seat weight sensor arranged for measuring weight of an object on the seat;
   a buckle having an anchor on an inboard side of the seat;
   a tongue plate carried on the seat belt webbing for being latched in the buckle anchor; and
   a lower anchor simulator for the seat that allows a connection between the seat belt webbing or the lower anchor for the webbing and the seat to be established that is operable with the seat belt webbing secured about the object on the seat with the simulator connection being separate from the latched tongue plate and buckle,
   wherein the lower anchor simulator includes cooperating portions of the lower anchor and the seat which are operably engaged with the seat belt secured about an object on the seat to form the simulator connection, the seat includes a frame rail to which the seat weight sensor is mounted, and the cooperating portions comprise arms of the seat frame rail and the lower anchor.

12. The passenger restraint system of claim 11 wherein the simulator connection is at the outboard side of the seat.

13. The passenger restraint system of claim 11 including an airbag for being inflated adjacent the vehicle seat in emergency conditions, and the lower anchor simulator is operable to substantially cancel out downward forces of the secured seat belt about the object to allow the seat weight sensor to substantially accurately measure weight of the object on the seat, and
   a controller for the airbag that receives the substantially accurately measured weight of the object by the seat weight sensor and based on the object weight disables or enables operation of the airbag.

14. A seat belt tension force cancelling method comprising:
   securing a door-mounted seat belt about an object on a vehicle seat;
   transferring upward directed forces on a door-mounted, lower anchor for the seat belt to the vehicle seat; and
   cancelling downward directed forces generated by the secured seat belt on the object by the transferred upward directed forces,
   wherein the upward directed forces are transferred selectively.

15. A seat belt tension force cancelling method comprising:
   securing a door-mounted seat belt about an object on a vehicle seat;
   transferring upward directed forces on a door-mounted, lower anchor for the seat belt to the vehicle seat; and cancelling downward directed forces generated by the secured seat belt on the object by the transferred upward directed forces, wherein the upward directed forces are transferred by engaging portions of the seat belt or lower anchor and the vehicle seat with the seat belt secured about an object on the seat, the portions include cooperating portions of the lower anchor and a frame member of the seat, and the lower anchor and frame portions are engaged automatically as a result of securing the seat belt about the object on the seat.

16. The method of claim 15 including sensing an accurate weight of the object on the seat, and enabling or disabling operation of an airbag associated with the seat based on the accurate sensed weight of the object.

17. A seat belt tension force cancelling method comprising:

securing a door-mounted seat belt about an object on a vehicle seat;

transferring upward directed forces on a door-mounted, lower anchor for the seat belt to the vehicle seat; and cancelling downward directed forces generated by the secured seat belt on the object by the transferred upward directed forces, wherein the upward directed forces are transferred by engaging portions of the seat belt or lower anchor and the vehicle seat with the seat belt secured about an object on the seat, the portions include cooperating portions of the seat belt and frame member of the seat, and the seat belt and frame portions are engaged selectively.

18. The method of claim 17 wherein the portions are a tongue plate of the seat belt and a buckle of the seat frame member that are selectively latched together.

* * * * *